US012644900B2

(12) United States Patent
Bachmair et al.

(10) Patent No.: US 12,644,900 B2
(45) Date of Patent: Jun. 2, 2026

(54) METHOD OF OPERATING A LABORATORY INSTRUMENT

(71) Applicant: Roche Molecular Systems, Inc., Pleasanton, CA (US)

(72) Inventors: Eveline Bachmair, Zurich (CH);
Andreas Gisler, Thalwil (CH);
Raphael Gut, Lucerne (CH);
Alejandro Hernandez, Horgen (CH);
Alexander Meier, Zurich (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 995 days.

(21) Appl. No.: 17/179,835

(22) Filed: Feb. 19, 2021

(65) Prior Publication Data

US 2022/0268796 A1 Aug. 25, 2022

Related U.S. Application Data

(63) Continuation of application No. PCT/EP2019/072072, filed on Aug. 19, 2019.

(51) Int. Cl.

| | |
|---|---|
| *G01N 35/10* | (2006.01) |
| *B01L 3/02* | (2006.01) |
| *G01M 3/32* | (2006.01) |
| *G01F 23/14* | (2006.01) |
| *G01F 23/24* | (2006.01) |
| *G01F 23/263* | (2022.01) |

(52) U.S. Cl.
CPC ........ *G01N 35/1016* (2013.01); *B01L 3/0237* (2013.01); *G01M 3/32* (2013.01); *G01N 35/1011* (2013.01); *B01L 2200/0605*

(2013.01); *G01F 23/14* (2013.01); *G01F 23/24* (2013.01); *G01F 23/263* (2013.01); *G01N 2035/1025* (2013.01)

(58) Field of Classification Search
None
See application file for complete search history.

(56) References Cited

U.S. PATENT DOCUMENTS

| | | | | |
|---|---|---|---|---|
| 4,586,546 A | * | 5/1986 | Mezei | ................ G01N 35/1011 141/2 |
| 5,090,255 A | * | 2/1992 | Kenney | ................. B01L 3/0227 73/864.18 |
| 7,661,289 B1 | * | 2/2010 | Jhutty | ................... B01L 3/0268 73/1.02 |

(Continued)

FOREIGN PATENT DOCUMENTS

| | | |
|---|---|---|
| CN | 108226541 A | 6/2018 |
| EP | 3336557 A1 | 6/2018 |

(Continued)

*Primary Examiner* — Brian R Gordon
(74) *Attorney, Agent, or Firm* — Maneesh Gupta

(57) ABSTRACT

Disclosed is a method and laboratory instrument aimed at reducing the loss of time of liquid level determination each time a liquid container is loaded into an instrument and at the same time reducing waste of liquid containers due to unforeseen changes in the liquid levels by combining a fast liquid level check at an expected liquid level with a liquid level search if no liquid level is found at the expected level, while also ensuring proper liquid aspiration as the liquid level is always verified (expected level is not blindly relied upon).

6 Claims, 5 Drawing Sheets

(56)                    References Cited

U.S. PATENT DOCUMENTS

| | | | | |
|---|---|---|---|---|
| 9,470,570 | B2 | 10/2016 | Nishida et al. | |
| 9,541,567 | B2 | 1/2017 | Kurono et al. | |
| 9,897,623 | B2* | 2/2018 | Iwamura | G01N 35/1011 |
| 11,906,346 | B2* | 2/2024 | Sato | G01N 35/04 |
| 2005/0095723 | A1* | 5/2005 | DiTrolio | B01L 3/0213 |
| | | | | 422/522 |
| 2005/0124059 | A1* | 6/2005 | Kureshy | G01N 35/1011 |
| | | | | 435/287.2 |
| 2005/0242117 | A1* | 11/2005 | Yoshida | G01F 23/292 |
| | | | | 222/113 |
| 2006/0101926 | A1* | 5/2006 | Komatsu | B41J 2/125 |
| | | | | 73/865.9 |
| 2010/0119415 | A1* | 5/2010 | Ogusu | G01N 35/1002 |
| | | | | 422/81 |
| 2011/0318845 | A1* | 12/2011 | Kurono | G01N 35/0092 |
| | | | | 422/68.1 |
| 2014/0106467 | A1* | 4/2014 | Hutter | G01N 35/1016 |
| | | | | 436/180 |
| 2014/0190253 | A1* | 7/2014 | Nishida | G01F 23/00 |
| | | | | 73/304 C |
| 2014/0193918 | A1* | 7/2014 | Takahashi | G01N 35/1011 |
| | | | | 422/67 |
| 2015/0031143 | A1 | 1/2015 | Suzuki et al. | |
| 2015/0079663 | A1* | 3/2015 | Katagi | G01N 35/1016 |
| | | | | 435/286.5 |
| 2015/0268230 | A1 | 9/2015 | Endo | |
| 2015/0292933 | A1* | 10/2015 | Wiggli | G01F 23/268 |
| | | | | 73/304 C |
| 2016/0018427 | A1 | 1/2016 | Streibl et al. | |
| 2016/0047835 | A1* | 2/2016 | Pingel | G01N 35/0099 |
| | | | | 73/864.25 |
| 2017/0016927 | A1 | 1/2017 | Korn et al. | |
| 2017/0023561 | A1* | 1/2017 | Martinell Gispert-Sauch | |
| | | | | G01N 35/00029 |
| 2018/0172717 | A1* | 6/2018 | Hamada | G01N 35/1009 |
| 2020/0132534 | A1* | 4/2020 | Luedemann | B01L 3/0217 |
| 2020/0300879 | A1* | 9/2020 | Kuze | G01N 35/1004 |
| 2021/0069693 | A1* | 3/2021 | Tseng | G01N 35/1016 |
| 2021/0096148 | A1* | 4/2021 | Horie | G01F 23/2961 |
| 2021/0293841 | A1* | 9/2021 | Sasaki | G01N 35/1002 |
| 2021/0311082 | A1* | 10/2021 | Tesluk | G01N 35/1011 |
| 2022/0034929 | A1* | 2/2022 | Yokota | G01N 35/1016 |
| 2022/0034930 | A1* | 2/2022 | Sagae | G01N 35/025 |
| 2022/0097037 | A1* | 3/2022 | Shahar | G01N 35/1016 |
| 2022/0128520 | A1* | 4/2022 | Okoba | G01N 35/1081 |
| 2022/0146540 | A1* | 5/2022 | Noda | G01N 35/00594 |
| 2022/0178960 | A1* | 6/2022 | Joji | G01N 35/00623 |
| 2022/0241806 | A1* | 8/2022 | Romo | B05D 1/02 |
| 2022/0326269 | A1* | 10/2022 | Minemura | G01N 35/1002 |
| 2022/0397582 | A1* | 12/2022 | Miyazaki | G01N 35/1009 |
| 2023/0003752 | A1* | 1/2023 | Zimmermann | G01N 35/00732 |
| 2023/0152343 | A1* | 5/2023 | Gut | B01L 3/021 |
| | | | | 422/67 |
| 2023/0184803 | A1* | 6/2023 | Sakai | G01N 35/1011 |
| | | | | 422/81 |
| 2023/0236056 | A1* | 7/2023 | Hirano | G01N 35/1016 |
| | | | | 73/304 C |
| 2023/0273231 | A1* | 8/2023 | Dunfee | G01N 35/1009 |
| 2023/0314455 | A1* | 10/2023 | Hara | G01N 35/00732 |
| | | | | 73/864.11 |
| 2023/0341425 | A1* | 10/2023 | Tamezane | G01N 35/1009 |
| 2023/0349940 | A1* | 11/2023 | Sheldon | G01N 35/1009 |
| 2023/0366904 | A1* | 11/2023 | Perroud | B01L 3/0279 |
| 2023/0408535 | A1* | 12/2023 | Nakai | G01N 35/00722 |
| 2024/0142487 | A1* | 5/2024 | Kabe | G01N 35/1016 |
| 2025/0058312 | A1* | 2/2025 | Zhou | G01G 19/52 |
| 2025/0093376 | A1* | 3/2025 | Frei | G01N 35/04 |

FOREIGN PATENT DOCUMENTS

| | | |
|---|---|---|
| JP | 05306973 A | 11/1993 |
| JP | 5121615 B2 | 11/2012 |
| JP | 2018096915 A | 6/2018 |
| WO | 2007129741 A1 | 11/2007 |

* cited by examiner

METHOD OF OPERATING A LABORATORY INSTRUMENT

CROSS-REFERENCE TO RELATED APPLICATION

This application claims the benefit and priority of European Application Serial No. 18189798.4, filed Aug. 20, 2018, and International Application Serial No. PCT/EP2019/072072, filed Aug. 19, 2019. Each of the referenced applications are incorporated herein by reference.

TECHNICAL FIELD

The present application relates to a computer implemented method of operating a laboratory instrument. The application further relates to a laboratory instrument configured to carry out the disclosed method. The application further relates to a computer program product comprising instructions which, when executed by a control unit of a laboratory instrument causes it to carry out the disclosed method.

BACKGROUND

In vitro diagnostic testing has a major effect on clinical decisions, providing physicians with pivotal information. In analytical laboratories, in particular, in-vitro diagnostic laboratories, a multitude of analyses on biological samples are executed by laboratory instruments in order to determine physiological and biochemical states of patients, which can be indicative of a disease, nutrition habits, drug effectiveness, organ function and the like.

For processing biological samples, laboratory instruments make use of various liquids, in particular reagents. Such liquids are provided to the laboratory instruments in liquid containers such as reagent cartridges. In order to allow the laboratory instruments to precisely aspirate such liquids (also called pipetting) the exact level of the liquid within the container must be known—otherwise there is a risk that air is aspirated instead of the liquid.

Various methods are known for determining the liquid level in containers, such as capacitive-, resistive-, pressure-based and extended liquid level detection. Since each of these methods to determine the liquid level takes an amount of time before the laboratory instrument can start aspirating the liquid, according to known laboratory practices, an expected liquid volume/level is stored in a datastore for each liquid container. Based on this expected liquid volume/level, the laboratory instrument can start aspirating immediately—without having to determine the liquid level first—thus saving significant amount of time. The expected volume/level may be stored initially during production (initial filling) of the liquid container and updated as the liquid is used. Updating the expected volume is performed either after each aspiration of liquid out of the liquid container and/or each time the container is loaded, respectively unloaded from a laboratory instrument and/or after a measurement of the liquid level, e.g. at regular intervals.

As a failsafe in order to avoid laboratory instruments from aspirating (usually air) from above a real liquid level lower than the expected liquid level, known laboratory instruments are configured to check whether the real liquid level in the liquid container does indeed match the expected liquid level. If the real liquid level in the liquid container does not match the expected liquid level, according to known laboratory practices, the liquid container is rejected by the laboratory instrument. Since methods used for determining presence/absence of liquid at a predetermined level are considerably faster than methods for determining the liquid level, this check does not significantly affect the performance of the laboratory instruments.

However, it has been observed that a relatively high number of liquid containers are rejected by laboratory instruments due to the real liquid level in the liquid container not matching the expected liquid level. This may lead to unnecessary waste of liquid containers, respectively liquids.

Inventors of the disclosed method/instrument recognized that real liquid levels often differ from the expected liquid level due unforeseen events (such as evaporation, spilling, leakages, use in a different instrument). Since liquids for use in analytical laboratories are expensive, there is a need for a method of operating a laboratory instrument which can both reduce the loss of time for liquid level determination each time a liquid container is loaded into an instrument and at the same time avoid unnecessary waste of liquid containers due to unforeseen changes in the liquid levels while ensuring proper liquid aspiration (avoiding aspiration above the real liquid level).

SUMMARY

The herein disclosed method of operating a laboratory instrument comprises the steps of:
  a) retrieving an expected volume of a liquid within a liquid container from a datastore;
  b) retrieving a container description of the liquid container from a datastore, the container description being indicative of a relationship between volume and height within the liquid container;
  c) determining by a control unit of an expected liquid level based on the container description and expected volume;
  d) perform a liquid level check at said expected liquid level using a first liquid detection method;
  e) if liquid is detected at expected liquid level, generate signal indicative of verified liquid level equal to expected liquid level;
  f) if liquid is not detected at expected liquid level:
    f1) perform a liquid level search using a second liquid detection method different from the first liquid detection method until liquid is detected;
    f2) update expected liquid level to a liquid level where liquid has been detected using the second liquid detection method;
    f3) repeat steps d) through f).
  Hence, the disclosed method/instrument reduces the loss of time of liquid level determination each time a liquid container is loaded into an instrument and at the same time reduces waste of liquid containers due to unforeseen changes in the liquid levels by combining a fast liquid level check at an expected liquid level with a liquid level search if no liquid level is found at the expected level, while also ensuring proper liquid aspiration as the liquid level is always verified (expected level is not blindly relied upon).

If the liquid level is higher than expected—indicative of an unauthorized refilling—then the disclosed method/system would detect liquid at the expected level and therefore use the expected level/volume for all further operations. Therefore, embodiments of the disclosed method/system are also advantageous since refilling of liquid containers is made useless as the amount of extra refilled volume becomes unusable. As the instruments would ignore the extra refilled volume of liquid, unauthorized refilling is greatly discouraged.

BRIEF DESCRIPTION OF THE DRAWINGS

Further characteristics and advantages of the disclosed method/device/system will in the following be described in detail by means of the description and by making reference to the following drawings.

DETAILED DESCRIPTION

Figure 1:
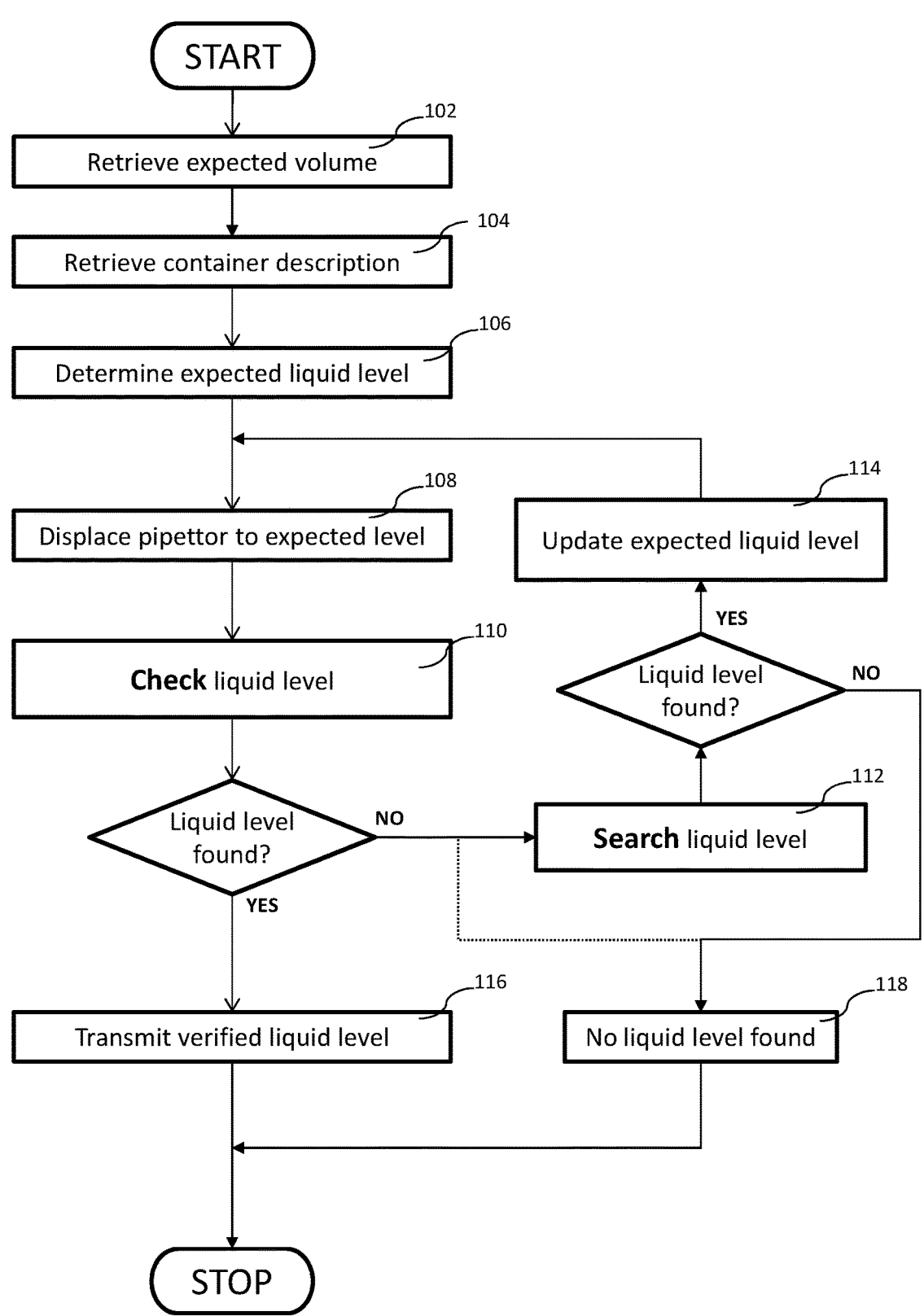
FIG. 1 A flowchart illustrating an embodiment of the method disclosed herein.

Certain terms will be used in this patent application, the formulation of which should not be interpreted to be limited by the specific term chosen, but as to relate to the general concept behind the specific term.

The term 'laboratory instrument' as used herein encompasses any apparatus or apparatus component operable to execute one or more processing steps/workflow steps on one or more biological samples and/or one or more reagents. The expression 'processing steps' thereby refers to physically executed processing steps such as centrifugation, aliquotation, sample analysis and the like. The term 'instrument' covers pre-analytical instruments, post-analytical instruments and also analytical instruments.

The term 'analyzer'/'analytical instrument' as used herein encompasses any apparatus or apparatus component configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectrometry of proteins or metabolites and physical or chemical parameters of various types. An analytical instrument may comprise units assisting with the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis.

Examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The term 'control unit' as used herein encompasses any physical or virtual processing device configurable to control a laboratory instrument/or system comprising one or more laboratory instruments in a way that workflow(s) and workflow step(s) are conducted by the laboratory instrument/system. The control unit may, for example, instruct the laboratory instrument/system to conduct pre-analytical, post analytical and analytical workflow(s)/workflow step(s). The control unit may receive information from a data management unit regarding which steps need to be performed with a certain sample. In some embodiments, the control unit might be integral with a data management unit, may be comprised by a server computer and/or be part of one laboratory instrument or even distributed across multiple instruments of the laboratory system. The control unit may, for instance, be embodied as a programmable logic controller running a computer-readable program provided with instructions to perform operations.

The term 'pipettor' as used herein comprises a device (such as a liquid handling robot) for aspirating and for dispensing a volume of a sample or other liquid, such as reagents or diluting buffer, from respectively into a vessel/container, such as a reaction vessel, a microplate plate, a reagent container etc. The pipettor may comprise one or more reusable washable needles such as a steel needle, or use disposable pipette tips. The component of the pipettor that comes in contact with the liquid is referred to as the 'probe'. The pipettor may be mounted to a transfer head that can be moved in one or two directions of travel in a plane, e.g., with guiding rails and a third, vertical direction of travel orthogonal to the plane, with a spindle drive or the like. For instance, the pipettor may be moved horizontally between a primary sample tube and a vessel, and vertically in order to withdraw or dispense the liquid biological sample or other liquids. The pipettor may be integrated, i.e. built in a laboratory instrument or be a separate instrument module of the system operatively connected to an instrument. Hereafter, when referring to positioning the pipettor, positioning of the tip/end of the probe is meant which comes first in contact with the liquid.

The term 'liquid' as used herein relates to any type of liquid which has to be transferred during a laboratory process. Thus, the term includes liquid samples. It also includes reagents/suspensions of reagents, control or calibration material.

The terms 'sample', 'patient sample' and 'biological sample' refer to material(s) that may potentially contain an analyte of interest. The patient sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like. The patient sample can be pretreated prior to use, such as preparing plasma from blood, diluting viscous fluids, lysis or the like. Methods of treatment can involve filtration, distillation, concentration, inactivation of interfering components, and the addition of reagents. A patient sample may be used directly as obtained from the source or used following a pretreatment to modify the character of the sample. In some embodiments, an initially solid or semi-solid biological material can be rendered liquid by dissolving or suspending it with a suitable liquid medium.

In some embodiments, the sample can be suspected to contain a certain antigen or nucleic acid.

The term 'analyte' is a component of a sample to be analyzed, e.g. molecules of various sizes, ions, proteins, metabolites and the like. Information gathered on an analyte may be used to evaluate the impact of the administration of drugs on the organism or on particular tissues or to make a diagnosis. Thus 'analyte' is a general term for substances for which information about presence and/or concentration is intended. Examples of analytes are e.g. glucose, coagulation parameters, endogenic proteins (e.g. proteins released from the heart muscle), metabolites, nucleic acids and so on.

The term 'reagent' as used herein refers to materials necessary for performing an analysis of analytes, including reagents for sample preparation, control reagents, reagents for reacting with the analyte to obtain a detectable signal, and/or reagents necessary for detecting the analyte. Such reagents may include reagents for isolating an analyte and/or reagents for processing a sample and/or reagents for reacting with an analyte to obtain a detectable signal and/or washing reagents and/or diluents.

The term 'liquid container' as used herein encompasses any vessel suitable to hold a liquid such as a container, the vessel comprising an opening for dispensing/aspirating liquid into respectively out of the vessel. The opening may be closed by a cap, a breakable seal or like suitable means for closing the opening in a liquid-tight manner. When referring to 'liquid level', the distance from an inner bottom of a container until the top surface of the liquid is hereby meant.

The term 'reagent cassette' as used herein refers to any vessel/container comprising a liquid or suspension of reagents. Alternatively, a reagent cassette is a holder for holding container(s) comprising a liquid or a suspension of reagents.

In practical use, many analytical methods require precise pipetting operations in order to maintain satisfactory analytical accuracy. Usually, pump-controlled probes are being used for aspirating and discharging liquids. In order to minimize the danger of cross-contamination and facilitate probe cleaning, it is desirable to position the probe tip just below the liquid surface. The liquid can either be aspirated while keeping the probe stationary or—in case of larger volumes—while lowering the probe further into the vessel so as to maintain the probe tip in the liquid.

In many cases, liquid levels can greatly vary from one liquid vessel to another so that the probe tip has to be reliably positioned within the liquid before starting a pipetting operation. Hence, it is customary to detect the liquid level prior to positioning the probe. In prior art, 'liquid level detection' is known to be based on various physical principles such as detecting light reflected from the liquid surface or measuring electric characteristics of the probe when put in contact with the liquid or measuring a pressure in the pipettor.

For example, in a method known as 'capacitive liquid level detection cLLD', when using a technique based on the change of electric capacitance of the probe, the probe is repeatedly charged and discharged using low-frequent electric voltage signals. In order to capacitively determine the uppermost liquid level, the amount of time required to reach a pre-determined voltage value is repeatedly measured. In the patent literature, liquid level detection based on capacitance change, e.g., is described in EP 89115464 A2, U.S. Pat. No. 7,150,190 B2, EP 164679, EP 355791, U.S. Pat. No. 4,818,492 and EP 555710. Each of these disclosures are incorporated herein by reference in their entireties.

An enhanced method of capacitive liquid level detection, called 'extended liquid level detection eLLD' comprises the steps of: providing a probe having an electric capacitance; moving said probe into said sample; repeatedly performing a pair of consecutive steps of charging and at least partially dis-charging said probe to generate a discharging current; measuring a quantity indicative of said discharging current for each pair of consecutive steps of charging and at least partially discharging said probe; analyzing said quantity in a manner to determine an electric resistance of said sample via said probe; discriminating said bulk liquid from said foam and/or said residuals of said bulk liquid based on a change of said electric resistance of said sample occurring when said probe contacts said bulk liquid. The method of extended liquid level detection eLLD is described in EP2607905, which is incorporated herein by reference.

Another approach to liquid level detection is measurement of the change of the Ohmic resistance of the probe occurring when the probe tip hits the bulk liquid. This method is referred to as 'resistive liquid level detection rLLD'. However, the liquid must be in galvanic contact with electric ground which, however, is often not the case. Liquid level detection based on Ohmic resistance measurements, is described for example in U.S. Pat. No. 5,843,378A, which is incorporated herein by reference.

An even further method for liquid level detection is based on measuring a pressure in the probe (or other fluidly connected part of the pipettor) and detecting a sudden change of the pressure which is indicative of the probe touching the liquid. This method is referred to as 'pressure liquid level detection pLLD'.

'Positive Pipetting Confirmation PPC' is a particular type of pressure-based liquid level detection, based on an analysis of features of a pressure curve obtained during aspiration or dispensation. These features can include pressure, slope and curvature data obtained from specific points of the pressure curve, extreme values (max./min. pressure, curvature, etc.) or points in time in which a specific pressure value is obtained. PPC is designed to detect pipetting errors due to non-ideal properties of liquid samples/reagents or a failure of the pipetting system.

Embodiments of the disclosed method/instrument shall now be described with reference to the figures.

FIG. 1 shows a flowchart of a first embodiment of the disclosed method. It shall be mentioned that steps preceding/following the claimed method comprise loading respectively unloading of the liquid container 50 into/from the laboratory instrument 10. However, as steps of loading respectively unloading of a liquid container into/from a laboratory instrument are well known in the art, these shall not be further elucidated herein.

According to the disclosed method/instrument, in a step 102, an expected volume of the liquid 60 within the liquid container 50 is retrieved from a datastore 13, 30, 53 (various embodiments of the datastore shall be described with reference to FIGS. 4A to 4C).

In a subsequent or simultaneous step 104, a container description of the liquid container 50 is retrieved from a datastore 13, 30, 53. It shall be noted that the datastore for the container description can, but must not be the same datastore as for the expected volume. The container description of the liquid container 50 is a piece of data allowing determination of the volume of liquid within the container based on liquid height (level) and/or determination of liquid height based on liquid volume.

According to a first embodiment, the container description comprises a formula of the relationship between the volume and height of liquid in the container 50. For example, if the container is a rectangular liquid container 50 with a constant cross section surface along its inner height, then the formula is:

$$V = L \times a \times b \text{ for the entire height of the container}$$

and calculating the liquid level based on liquid volume is straight forward:

$$L = \frac{V}{a \times b}$$

wherein V volume

L liquid level a width of container b length of container

Alternatively or additionally, the container description comprises a look-up table, with height—volume pairs for a number of discrete volume(s) respectively height(s). For liquid volume(s) respectively height(s) falling between such distinct values, known interpolation methods may be applied.

Based on the container description and expected volume, in a step 106, an expected liquid level eL is determined by the control unit 12 of the laboratory instrument 10.

Thereafter a liquid level check is performed by the pipettor 20 at the expected liquid level eL. The liquid level check comprises two steps. In step 108, the pipettor 20 is displaced vertically to the expected liquid level eL. The displacement in step 108 is performed directly to the expected liquid level eL without searching the level of the liquid, which allows for a greater displacement speed. In step 110, the presence of liquid 60 at the expected liquid level eL is performed using a first liquid detection method.

If liquid is detected at expected liquid level eL (using the first liquid detection method), in a step 116, the control unit 12 generates a signal indicative of the verified liquid level vL equal to the expected liquid level eL, thereby confirming the expected liquid level eL respectively volume. Thereafter the laboratory instrument 10 can aspirate/dispense liquid 60 out of/into the liquid container 50 based on verified information on the verified liquid level vL in the liquid container 50.

On the other hand, if liquid is not detected at the expected liquid level eL, the level of the liquid is searched in step 112 using a second liquid detection method. The difference between a liquid check and liquid search method is hereby emphasized:

a. A liquid level check method is designed to check or confirm the existence of liquid at a given level.

The liquid level check is also called a discrete method and comprises the steps of:

displacing the pipettor 20 vertically into an opening of the liquid container 50 at a first speed until the expected liquid level eL;

detecting presence/absence of liquid at the expected liquid level eL

The output of the liquid check method is of a yes/no (true/false) type indicative whether liquid has or has not been detected at the given level.

b. A liquid level search method on the other hand is designed to determine the level of a liquid. In order to determine an unknown level of the liquid, the liquid search method is either a continuous or repetitive liquid detection method or a combination thereof.

In a (quasi) continuous liquid level detection, while searching the liquid level, presence of liquid is continuously monitored as the pipettor is displaced vertically in the liquid container 50.

In a repetitive liquid level detection, while searching the liquid level, presence of liquid is determined repeatedly at regular time and/or distance intervals as the pipettor is displaced vertically in the liquid container 50.

According to particular embodiments of the disclosed method, the first speed of displacing the pipettor 20 vertically within an opening of the liquid container 50 for liquid level check is higher than the second speed of displacing the pipettor 20 vertically within an opening of the liquid container 50 for liquid level search. Particularly, the first vertical displacement speed of the pipettor for liquid level check is 2 to 10 times faster than the second displacement speed for the liquid level search. Since most of the times the liquid level matches the expected level and thus only a liquid level check is necessary, the disclosed method/system allows a great saving in time.

If the level of the liquid 60 is found in the liquid level search using the second liquid detection method, then in a step 114, the expected liquid level eL is updated to equal the level of the liquid 60 found using liquid level search. Updating of the expected liquid level eL shall not be confused with transmitting the expected liquid level eL, as the latter is done only (in step 116) after confirming by means of liquid level check.

After updating the expected liquid level eL (in step 114), this updated expected liquid level eL is verified/confirmed by a liquid level check using the first liquid detection method (steps 108 and 110). According to embodiments of the disclosed method/instrument, the pipettor is raised vertically after a liquid level is found (by liquid level search) and before the subsequent liquid level check.

If the liquid level found by liquid level search cannot be confirmed by liquid level check at the updated expected liquid level eL, the liquid level search is repeated. There can be several reasons for a liquid level found by liquid level search not to be confirmed by liquid level check, such as the existence of foam on the surface of the liquid, which is mistaken for liquid during liquid level search. The combination of a (relatively) quick search and confirmation by a liquid level check method ensures an increased level of reliability of determination of the verified liquid level vL.

On the other hand, if the liquid level found by liquid level search is confirmed by liquid level check at the updated expected liquid level eL, in step 116, the control unit 12 generates a signal indicative of the verified liquid level vL equal to the (updated) expected liquid level eL. Thereafter the laboratory instrument 10 can aspirate/dispense liquid 60 out of/into the liquid container 50 based on verified information on the verified liquid level vL in the liquid container 50.

If in step 112, no liquid is found during liquid level search by the pipettor 20, a signal is generated in step 118 indicative of no liquid 60 detected in the liquid container 50.

According to further embodiments of the disclosed method/instrument (illustrated on FIG. 1 with dotted lines), if after repeating the steps of liquid level searching respectively check of level found for a maximum number of times, the liquid level found by the liquid level search using the second liquid detection method can still not be confirmed by the liquid level check, the process is aborted and a signal is generated in step 118 indicative of no liquid 60 detected in the liquid container 50.

According to embodiments of the disclosed method/ instrument, the liquid level check and/or the liquid level search comprises one or more of the following:

pressure-based Liquid Level Detection pLLD;
    capacitive Liquid Level Detection cLLD;
    resistive Liquid Level Detection rLLD;
    extended Liquid Level Detection eLLD;
    Positive Pipetting Confirmation PPC.

According to embodiments of the disclosed method/ instrument, after transmission of a signal indicative of the verified liquid level vL equal to the (updated) expected liquid level eL in step 116, the expected volume of liquid 60 in the liquid container 50 is updated in the datastore 13, 30, 53 based on the container description of the liquid container 50 and the signal indicative of verified liquid level vL.

FIGS. 2A through 2F show (highly schematically) the sequence of liquid level check and liquid level search.

Figure 2A:
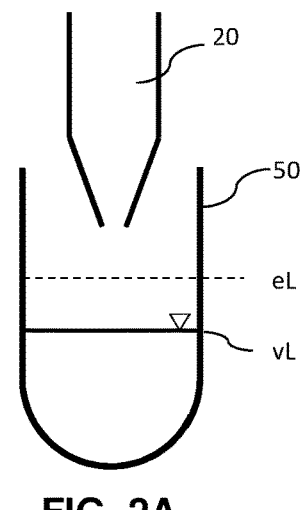
FIG. 2A-2F A sequence of figures illustrating an embodiment of the liquid level check/search method disclosed herein.
Figure 2B:
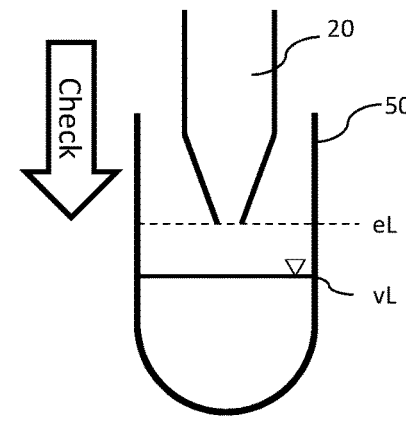
Figure 2C:
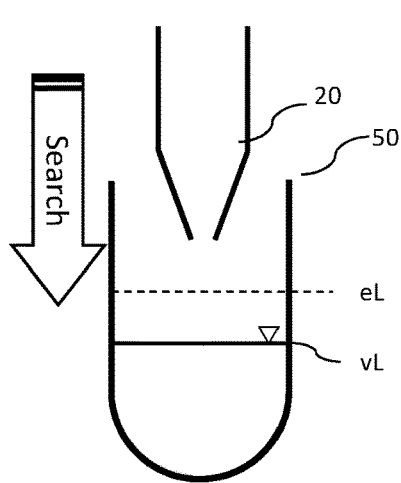
Figure 2D:
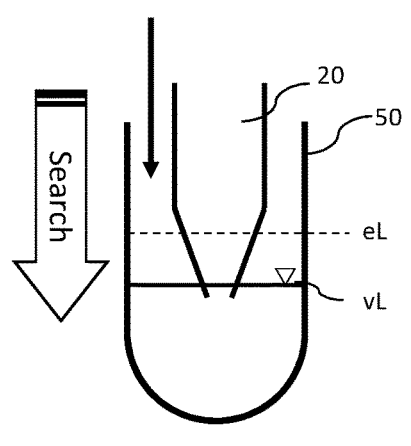
Figure 2E:
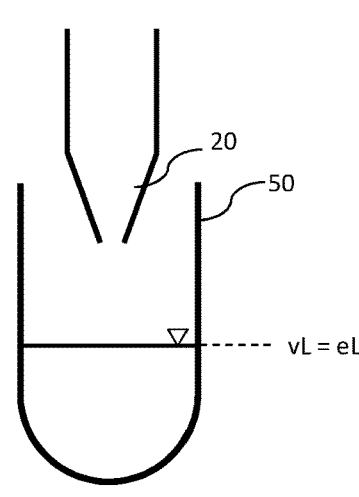
Figure 2F:
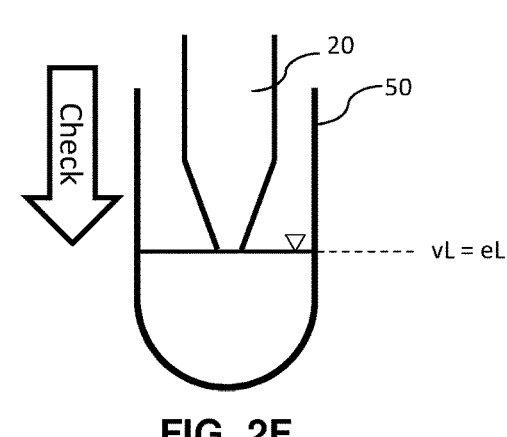

FIG. 2A shows the pipettor 20 positioned above the expected liquid level eL in an opening of the liquid container 50. FIG. 2B shows the pipettor 20 displaced exactly at the expected liquid level eL, which however does not coincide with the verified liquid level vL. Therefore, as shown on FIG. 2C, liquid level search is performed by displacing the pipettor vertically downwards and at the same time monitoring the presence/absence of liquid by the pipettor 20. FIG. 2D shows the moment the liquid level search method detects liquid and finds the verified liquid level vL. The liquid level search is hence complete and as shown in FIGS. 2E and 2F, the pipettor 20 is retrieved and displaced vertically downwards again during liquid level check in order to confirm the verified liquid level vL.

Figure 3:
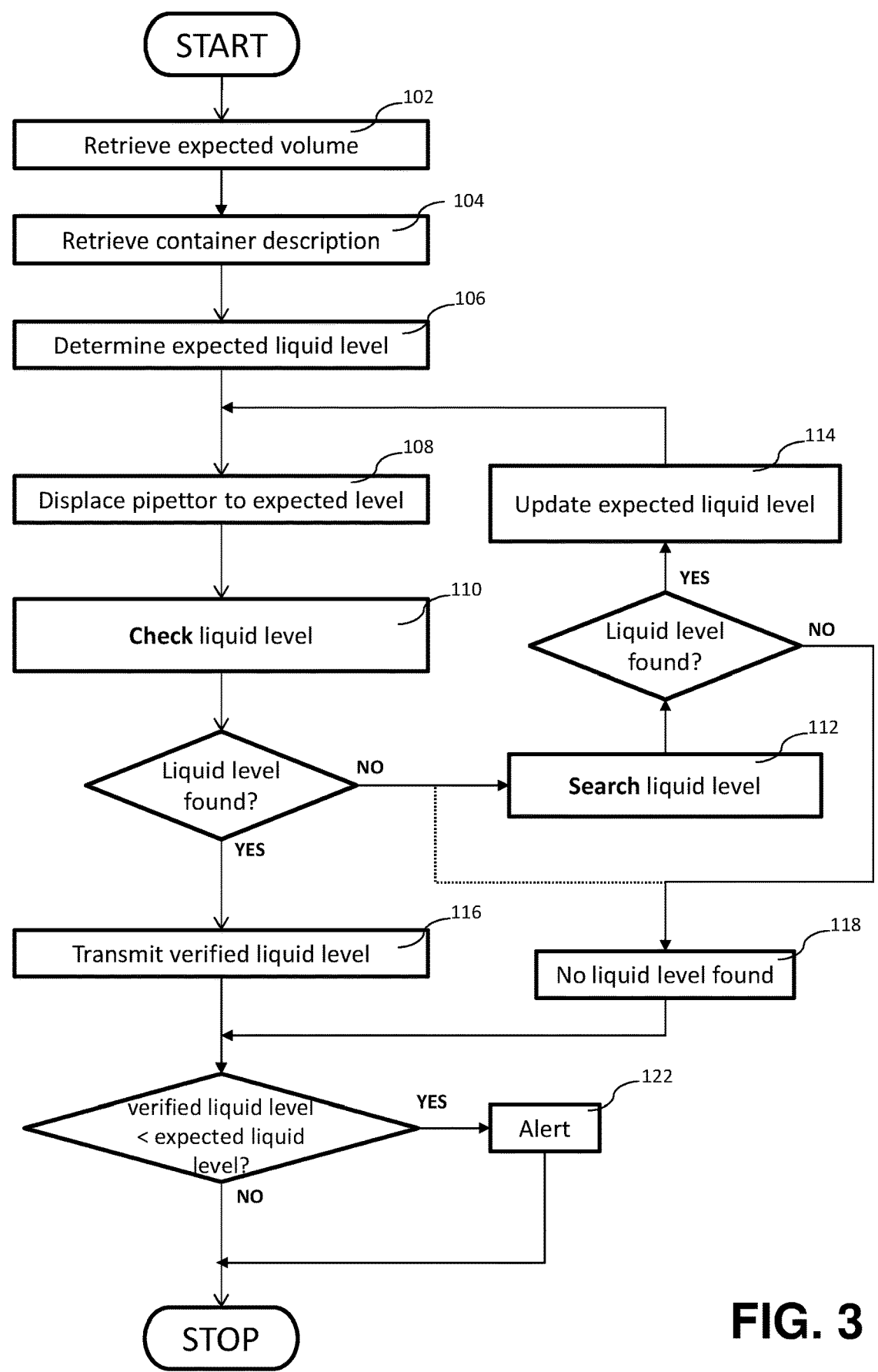
FIG. 3 A flowchart illustrating a further embodiment of the method disclosed herein.

FIG. 3 shows a further embodiment of the disclosed method, wherein an alert signal is generated in step 122 if the verified liquid level vL is lower than the expected liquid level eL indicative of:

liquid evaporation; and/or
    leakage of the liquid container 50; and/or
    liquid spillage during handling of the liquid container 50; and/or
    past aspiration of erroneous liquid volumes.

According to further embodiments, the disclosed method further comprises the steps of:

retrieving a requested volume of liquid to be aspirated;
    aspirating the requested volume of liquid 60 from the liquid container 50;
    updating expected volume of liquid in the liquid container 50 in the datastore 13, 30, 53 based on the container description of the liquid container 50, the signal indicative of verified liquid level vL and the requested volume of liquid 60.

Figure 4A:
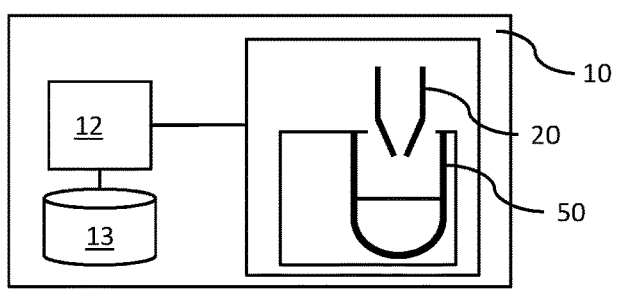
FIG. 4A A highly schematic block diagram of an embodiment of the disclosed laboratory instrument.

FIG. 4A shows a particular embodiment of the disclosed laboratory instrument 10, wherein the datastore is a memory 13 internal to the laboratory instrument 10 and communicatively connected to its control unit 12.

Figure 4B:
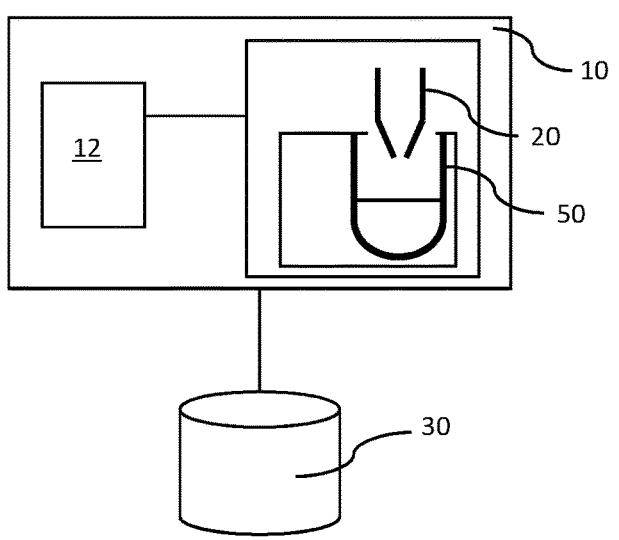
FIG. 4B A highly schematic block diagram of a further embodiment of the disclosed laboratory instrument.

FIG. 4B shows a particular embodiment of the disclosed laboratory instrument 10, wherein the datastore is a database 30 external and communicatively connected to the laboratory instrument 10, such as a laboratory middleware, a laboratory information system LIS or the like.

Figure 4C:
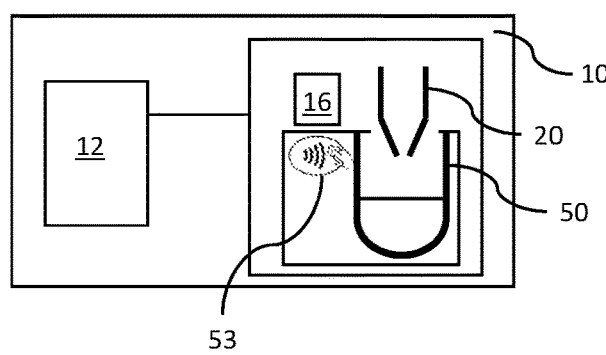
FIG. 4C A highly schematic block diagram of an even further embodiment of the disclosed laboratory instrument.

FIG. 4C shows a further particular embodiment of the disclosed laboratory instrument 10, wherein the datastore is an RFID tag 53 attached to the liquid container 50, the laboratory instrument 10 comprising an RFID reader/writer 16 communicatively connected to its control unit 12 and configured to retrieve respectively transmit data—such as the expected liquid level eL—from respectively to the RFID tag 53.

Figure 5:
FIG. 5 A highly schematic diagram of a pipettor of the disclosed laboratory instrument.
Figure 5:
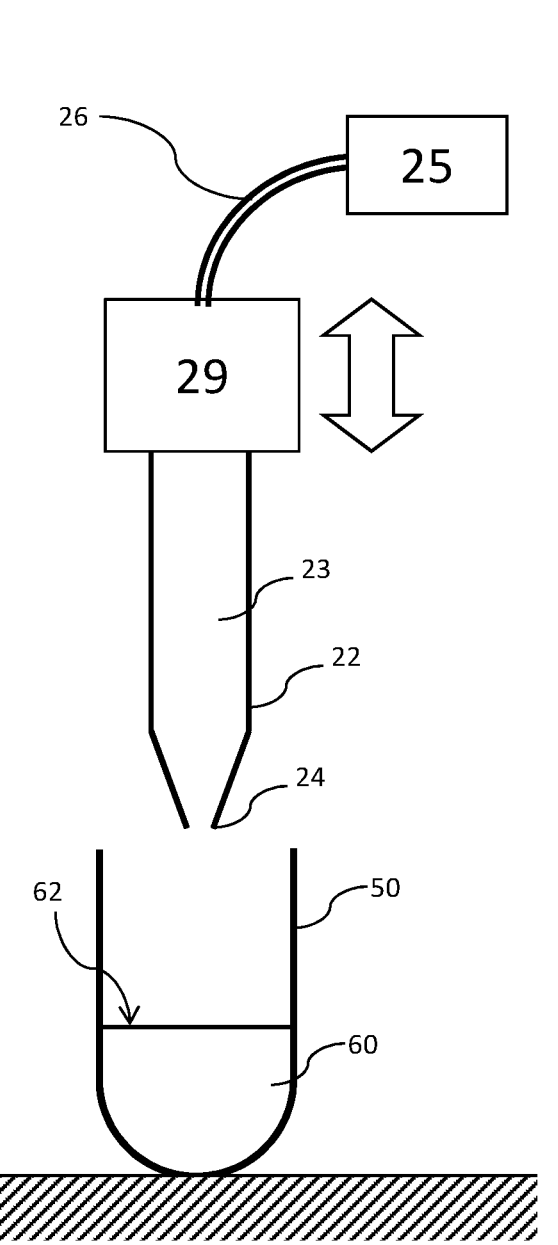

FIG. 5 shows a schematic block diagram of a pipettor 20. The pipettor generally referred to at reference numeral 20 includes a probe 22, e.g. a reusable needle or a disposable tip. Specifically, the probe 22 is provided with an inner (fluid) channel 23 which at probe tip 24 opens to the ambient. At an opposite side thereof, the probe 22 is fluidly connected to a pump 25 by a pump conduit 26 for generating a negative or positive pressure in the channel 23 so that liquids can be sucked-in or discharged according to the specific demand. Since pumps for operating pipettes are well-known to those of skill in the art, e.g., from commercially available laboratory instruments, the pump 25 is not further elucidated herein.

The probe 22 can, e.g., be configured as needle made of metallic material such as, but not limited to, stainless steel and can have a sharpened probe tip 24 for facilitating penetration of a cap (not illustrated) in case of a top-closed liquid container 50. Alternatively, or additionally the probe 22 is configured as a disposable tip made of a plastic material intended for single use.

With continued reference to FIG. 5, in the pipettor 20, the probe 22 can be used to aspirate liquid 60 contained in the liquid container 50.

With yet continued reference to FIG. 5, the pipettor 20 further includes an automated positioning mechanism 29 for positioning the probe 22 with respect to the liquid container 50. Specifically, the positioning mechanism 29 can, e.g., be adapted to vertically translate the probe 22 towards and away from the liquid container 50 as illustrated by the double-headed arrow. Since such positioning mechanism 29 is well-known to those of skill in the art, e.g., from commercially laboratory instruments, it is not further elucidated herein.

Operating the positioning mechanism 29, the probe 22 can be vertically lowered to thereby reach a position where the probe tip 24 dips into the liquid 60 to perform pipetting operations. Particularly, the probe tip 24 can be positioned a small distance below the liquid surface 62 in order to minimize the contact between liquid 60 and the probe 22. By placing the probe tip 24 in the bulk liquid 60 pipetting operations can reliably be performed.

It will be understood that the above are examples to illustrate the present disclosure and that many variations could be adopted based on the specific structure hereinbefore described without departing from the scope as defined in the claims.

Further disclosed and proposed is a computer program product including computer-executable instructions for performing the disclosed method in one or more of the embodiments enclosed herein when the program is executed on a computer or computer network. Specifically, the computer program may be stored on a computer-readable data carrier or a server computer. Thus, specifically, one, more than one or even all of method steps as indicated above may be performed by using a computer or a computer network, preferably by using a computer program.

As used herein, a computer program product refers to the program as a tradable product. The product may generally exist in any format, such as in a downloadable file, on a computer-readable data carrier on premise or located at a remote location (cloud). Specifically, the computer program product may be distributed over a data network (such as a cloud environment). Furthermore, not only the computer program product, but also the execution hardware may be located on-premise or in a cloud environment.

Further disclosed and proposed is a computer-readable medium comprising instructions which, when executed by a computer system, cause a laboratory system to perform the method according to one or more of the embodiments disclosed herein.

Further disclosed and proposed is a modulated data signal comprising instructions which, when executed by a computer system, cause a laboratory system to perform the method according to one or more of the embodiments disclosed herein.

While the current disclosure has been described in relation to its specific embodiments, it is to be understood that this description is for illustrative purposes only. Accordingly, it is intended that the disclosure be limited only by the scope of the claims appended hereto. In addition, various publications are cited herein, the disclosures of which are incorporated by reference in their entireties.

REFERENCE LIST laboratory instrument 10
control unit (of laboratory instrument) 12
memory (of instrument) 13
RFID reader/writer 16
pipettor 20
probe 22
inner channel 23
probe tip 24
pump 25
pump conduit 26
positioning mechanism 29
database (communicatively connected to instrument) 30
liquid container 50
RFID tag (of container) 53
liquid 60
liquid surface 62
expected liquid level eL
verified liquid level vL
retrieve expected volume step 102
retrieve container geometry step 104
determine expected liquid level step 106
move pipetting tip to expected level step 108
check liquid level presence step 110
search liquid level step 112
update expected liquid level step 114
transmit real liquid level step 116
transmit no liquid found step 118
raise alert (vL>eL) step 120
raise alert (vL<eL) step 122

The invention claimed is:

1. A computer implemented method of operating a laboratory instrument comprising a pipettor and a computer-implemented control unit configured to control said pipettor, the method comprising:
   a) retrieving, by the control unit, an expected volume of a liquid within a liquid container from a datastore;
   b) retrieving, by the control unit, a container description of the liquid container from the datastore, the container description being indicative of a relationship between volume and height of a liquid within the liquid container;

c) determining by the control unit, an expected liquid level (eL) based on the container description and the expected volume;
   d) performing a liquid level check at said expected liquid level (eL) by the pipettor, the liquid level check comprising displacing the pipettor vertically into an opening of the liquid container to a position corresponding to the expected liquid level and sensing if liquid is detected at the expected liquid level;
   e) if liquid is detected at the expected liquid level (eL), generating, by the control unit, a signal indicative of a verified liquid level (vL) equal to the expected liquid level (eL);
   f) if liquid is not detected at the expected liquid level (eL):
      f1) performing a liquid level search by the pipettor until liquid is detected, the liquid level search comprising displacing the pipettor vertically into an opening of the liquid container until liquid is detected;
      f2) updating the expected liquid level (eL) to a liquid level where liquid has been detected using the liquid level search;
      f3) repeating steps d) through f).

2. The method of claim 1, wherein steps d) through f) are repeated a predefined maximum number of times, the method further comprising a step of generating a signal indicative of no liquid detected in the liquid container:
   if liquid is not detected during the liquid level search of step f1) by the pipettor; and/or
   if after repeating steps d) through f) the predefined maximum number of times, a liquid level found by the liquid level search is not confirmed by the liquid level check at said expected liquid level (eL).

3. The method of claim 1, further comprising a step of updating, by the control unit, the expected volume of liquid in the liquid container in the datastore based on the container description of the liquid container and the signal indicative of the verified liquid level (vL).

4. The method of claim 3, further comprising:
   retrieving from the datastore, by the control unit, a requested volume of liquid to be aspirated;
   aspirating, by the pipettor, the requested volume of liquid from the liquid container;
   updating, by the control unit, the expected volume of liquid in the liquid container in the datastore based on the container description of the liquid container, the signal indicative of verified liquid level (vL) and the requested volume of liquid.

5. The method of claim 1, further comprising a step of generating, by the control unit, an alert signal if the verified liquid level (vL) is lower than the expected liquid level (eL).

6. The method of claim 1, wherein:
   the liquid level check comprises displacing the pipettor vertically into the opening of the liquid container at a first speed, and
   the liquid level search comprises displacing the pipettor vertically within the opening of the liquid container at a second speed that is less than the first speed.

* * * * *